Patented Dec. 11, 1923.

1,476,890

UNITED STATES PATENT OFFICE.

CARL IDDINGS, OF WESTEND, CALIFORNIA.

PROCESS OF RECOVERING BORAX FROM SALINE LIQUORS.

No Drawings.   Application filed March 20, 1922. Serial No. 545,367.

*To all whom it may concern:*

Be it known that I, CARL IDDINGS, a citizen of the United States, and a resident of Westend, San Bernardino county, State of California, have invented a certain new and useful Process of Recovering Borax from Saline Liquors, of which the following is a specification.

The invention relates to a process of recovering borax (sodium tetraborate) from saline liquors containing the same and particularly from the brines of the alkali lakes of the western United States.

An object of the invention is to provide a cheap and economical process for recovering borax from saline liquors containing the same, in a crude state, sufficiently pure to be economically refined.

The invention possesses other advantageous features, some of which, with the foregoing, will be set forth at length in the following description, where I shall outline in full, one form of the process of my invention. I shall describe the process as applied to the brine of Searles Lake in California, but it is to be understood that the process is not limited to this particular brine.

Searles Lake brine contains sodium and potassium chloride, sulfate, carbonate, bicarbonate and borate. By the process of my invention I am able to employ natural temperatures for evaporation and cooling and I prefer to use the temperature variations of day and night, which are considerable at Searles Lake, but in some instances it may be desirable to make use of the temperature variations of winter and summer. Artificial heating and cooling however, may be employed when desired.

In the preferred form of my process, the lake brine, which is at a temperature of from 22° C. to 25° C., and which is saturated with sodium chloride, is pumped into a suitable concentration pond, in which the brine is subjected to evaporation, causing the crystallizing out of sodium chloride. The raw lake brine is substantially of the following composition, the results being stated in grams per litre:

| | |
|---|---|
| Potassium chloride | 54 |
| Sodium tetraborate | 23 |
| Sodium carbonate | 65 |
| Sodium sulfate | 80 |
| Sodium chloride | 220 |

The raw lake brine is usually exposed in the concentrating pond until its composition is approximately as follows, the results being stated in the same terms:

| | |
|---|---|
| Potassium chloride | 64 |
| Sodium tetraborate | 31 |
| Sodium carbonate | 84 |
| Sodium sulfate | 113 |
| Sodium chloride | 202 |

The partially concentrated brine is then transferred to small shallow ponds having a depth preferably not more than three inches. In these ponds the brine is exposed to heating and evaporation due to the natural temperatures of the day. Due to its shallowness, the brine is raised in temperature during the day to a temperature approaching the atmospheric temperature, so that evaporation and concentration is rapid. The brine is kept in the shallow ponds and allowed to concentrate at the raised temperature, which causes the precipitation of salts, mainly potassium sodium sulfate, sodium carbonate sulfate and sodium chloride. The proportions of these salts deposited will be governed by the temperature at which evaporation takes place, which in turn is governed by weather conditions such as wind, clouds etc. Should the brine remain in the shallow ponds for several days and nights, the night cooling will not cause a precipitation of borax unless the brine is agitated, the borax exhibiting a pronounced tendency to supersaturate. The cool of the nights, instead of being disadvantageous is really an advantage, since it causes the precipitation of sodium potassium sulfate. The brine should remain in the shallow ponds until it is saturated or nearly saturated with borax at the warm temperature of the brine, which is about 33° C. At this stage of the process, the brine has a consistency substantially as follows, the results being stated in the same terms as before:—

| | |
|---|---|
| Potassium chloride | 134 |
| Sodium tetraborate | 78 |
| Sodium carbonate | 167 |
| Sodium sulfate | 35 |
| Sodium chloride | 138 |

During the early hours of the morning, when the concentrated brine is at its lowest temperature it is transferred by pumping or otherwise to any suitable tank, pond, thickener or other convenient apparatus and subjected in the course of the transfer or subsequent to it to mechanical or one or more other forms of agitation. The pumping or other method of transfer may be itself sufficient to produce the necessary agitation or this agitation may be obtained by the use of mechanical devices, by additional pumping, by allowing the brine to fall from one level to another, or in other ways. When the brine is of such a character that cooling alone will not cause the separation of large quantities of salts other than borax, the cooling and agitation may be effected simultaneously. The cool brine, which should be at a temperature of from 10° C. to 30° C. is supersaturated with borax, sodium chloride and potassium chloride and on being subjected to agitation, these salts are crystallized out. The proportion of potassium chloride crystallized out depends upon the temperature to which the brine has been subjected in the shallow ponds and if the night temperatures have been low, the proportion of potassium chloride crystallized out upon agitation will be small. Also, if the day time temperatures affecting the brine in the shallow ponds has been low, the potassium will crystallize out on agitation as potassium sodium sulfate instead of as potassium chloride. With ordinarily favorable natural temperatures, the borax comprises about 40% of the deposited salts and under more favorable circumstances will comprise about 60%. In connection with the above operations I do not wish to limit myself to the temperature range specified.

The crude borax deposited may or may not be refined, depending upon the nature and amount of the impurities present. The refining step may comprise washing the deposited salts with water at natural or cool temperatures, whereby the borax is separated from the impurities, producing substantially pure borax. It may be further purified, if desired, by recrystallization from a hot solution.

Instead of first subjecting the raw lake brine to evaporation, it may be first subjected to cooling, thus crystallizing out sodium sulfate. The brine may then be concentrated as set forth hereinbefore, and the potassium will crystallize out with the borax as potassium chloride.

The operations of evaporation, cooling and agitation to cause the separation of the borax may if desired be carried out in a single pond or other suitable container, the effects being applied in such a way that crude borax of the grade of purity indicated above will be deposited in the pond or other apparatus in such form as to permit its convenient removal.

The several operations of evaporation, cooling and agitation may also be carried out in two deep ponds, one pond being used primarily for evaporation and the other primarily for cooling and agitation for effecting the separation of the borax. In carrying out the process described above I do not wish to limit myself to any particular combination of ponds or other suitable containers.

I claim:

1. The process of recovering borax from liquors containing the same and other salts which comprises evaporating and cooling the liquor to crystallize out other salts and bring the cool liquor to supersaturation with borax, removing the cool liquor from the deposited salts and agitating the cool liquor to crystallize out borax.

2. The process of recovering borax from liquors containing sodium and potassium chlorides, sulfates, carbonates and borates which comprises evaporating the liquor to deposit sodium chloride, sulfate and carbonate salts, separating the liquor from the deposited salts, cooling the liquor to deposit a potassium salt and bring the liquor to supersaturation with borax, separating the cool liquor from the deposited salt and agitating the liquor to deposit borax.

3. The process of recovering borax from liquors containing sodium and potassium chlorides, sulfates, carbonates and borates which comprises evaporating and cooling the liquor to crystallize out salts other than borax and bring the cool liquor to supersaturation with borax and agitating the liquor to crystallize out borax.

4. The process of recovering borax from liquors containing sodium and potassium chlorides, sulfates, carbonates and borates which comprises evaporating the liquor to crystallize out sodium chloride, removing the liquor from the deposited crystals, heating and evaporating the liquor to crystallize out potassium sodium sulfate, sodium carbonate sulfate and sodium chloride, cooling the liquor, removing the cool liquor from the deposited salts and agitating the liquor to crystallize out borax.

5. The process of recovering borax from liquors containing the same and other salts which comprises subjecting the liquor to natural temperature conditions of day and night whereby the liquor is heated, concentrated and cooled to deposit salts chiefly other than borax and bring the liquor to supersaturation with borax, separating the liquor from the deposited salts and agitating the liquor to crystallize out borax.

In testimony whereof, I have hereunto set my hand

CARL IDDINGS.